(12) United States Patent
Moore

(10) Patent No.: US 11,041,946 B2
(45) Date of Patent: Jun. 22, 2021

(54) MODEL-BASED PROTECTION ALGORITHMS

(71) Applicant: BAE SYSTEMS plc, London (GB)

(72) Inventor: Gary Roy Moore, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 368 days.

(21) Appl. No.: 16/306,817

(22) PCT Filed: May 24, 2017

(86) PCT No.: PCT/GB2017/051452
§ 371 (c)(1),
(2) Date: Dec. 3, 2018

(87) PCT Pub. No.: WO2017/207961
PCT Pub. Date: Dec. 7, 2017

(65) Prior Publication Data
US 2019/0310356 A1 Oct. 10, 2019

(30) Foreign Application Priority Data
Jun. 3, 2016 (GB) .................................. 1609729

(51) Int. Cl.
*G01S 7/524* (2006.01)
*G01S 7/52* (2006.01)
*G10K 11/34* (2006.01)

(52) U.S. Cl.
CPC .......... *G01S 7/524* (2013.01); *G01S 7/52004* (2013.01); *G10K 11/34* (2013.01); *G10K 11/346* (2013.01)

(58) Field of Classification Search
CPC ..... G01S 7/524; G01S 7/52004; G10K 11/34; G10K 11/346
See application file for complete search history.

(56) References Cited

U.S. PATENT DOCUMENTS

| 5,200,931 A | 4/1993 | Kosalos et al. |
| 6,201,680 B1 | 3/2001 | Tokatian |
| (Continued) | | |

FOREIGN PATENT DOCUMENTS

| GB | 2241115 A | 8/1991 |
| GB | 2422744 A | 8/2006 |
| (Continued) | | |

OTHER PUBLICATIONS

International Search Report and Written Opinion received for PCT Application No. PCT/GB2017/051452. dated Aug. 17, 2017. 16 pages.

(Continued)

*Primary Examiner* — Isam A Alsomiri
*Assistant Examiner* — Vikas Atmakuri
(74) *Attorney, Agent, or Firm* — Finch & Maloney PLLC

(57) ABSTRACT

Disclosed is a method of forming a transmission beam with a transducer array comprising a plurality of transducers, the method comprising: receiving at least one desired property for an intended transmission beam; determining an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array; and generating the transmission beam using the optimised operation parameter on the transducer array.

20 Claims, 9 Drawing Sheets

(56) References Cited

U.S. PATENT DOCUMENTS

| | | | | |
|---|---|---|---|---|
| 9,286,418 | B1* | 3/2016 | Butler | G10K 11/32 |
| 10,078,006 | B2* | 9/2018 | Hald | G01H 9/002 |
| 2002/0080685 | A1* | 6/2002 | Schmidt | F42B 19/005 |
| | | | | 367/153 |
| 2005/0033167 | A1* | 2/2005 | Trucco | G10K 11/34 |
| | | | | 600/437 |
| 2005/0033181 | A1 | 2/2005 | Hossack et al. | |
| 2006/0173322 | A1* | 8/2006 | Cai | G01S 7/5209 |
| | | | | 600/439 |
| 2007/0070814 | A1* | 3/2007 | Frodyma | G01S 15/02 |
| | | | | 367/134 |
| 2007/0093715 | A1* | 4/2007 | Hippe | B06B 1/0622 |
| | | | | 600/437 |
| 2010/0103775 | A1* | 4/2010 | Betts | G01S 15/107 |
| | | | | 367/88 |
| 2013/0116982 | A1* | 5/2013 | Lupien | G06F 30/00 |
| | | | | 703/1 |
| 2016/0069988 | A1* | 3/2016 | Foote | G01S 7/52004 |
| | | | | 367/13 |

FOREIGN PATENT DOCUMENTS

| | | |
|---|---|---|
| WO | 2016/010620 A1 | 1/2016 |
| WO | 2017/207961 A1 | 12/2017 |

OTHER PUBLICATIONS

GB Search Report received for GB Application No. 1609729.7, dated Dec. 2, 2016. 4 pages.

International Preliminary Report on Patentability received for PCT Application No. PCT/GB2017/051452. dated Dec. 13, 2018. 5 pages.

* cited by examiner

F is the transducer output rms force
U is the transducer head rms velocity

MODEL-BASED PROTECTION ALGORITHMS

The present invention concerns the provision of a method or a system for forming a transmission beam.

Embodiments of the invention find particular, but not exclusive, use when forming a transmission beam with a transducer array comprising a plurality of transducers.

When a sonar system is operated on a vehicle, it is often desirable to maximize an output from the sonar system, i.e. maximise the acoustic source level including the directional consideration, to optimise the performance of the transmission beam formed therefrom. However, in order to do this certain fail-safe limitations are needed in the way how the sonar system is implemented because otherwise permanent or temporary damage can occur to the components of the sonar system, such as the transducers, whilst transmitting high power signals for forming the transmission beam.

Due to limitations in the implemented hardware and in the available processing resources on board the vehicle, it is often necessary to use a pessimistic set of parameters as the fail-safe limitations. In many cases, this means limiting the transmitted power to a level significantly below that would otherwise have been possible even after considering potential permanent or temporary damage to the components. Such inefficient forming of the transmission beam may occur, in particular, when the transmission beam is steered with an array of a plurality of transducers since the acoustic interactions among the transducers cause wide variations in maximum amplitudes and power levels across the array of the transducers, and only the most pessimistic fail-safe limitations can be employed to the array of the transducers to prevent permanent or temporary damage.

It is an aim of embodiments of the present invention to provide for a method or a system for forming a transmission beam wherein the method or the system is capable of forming the transmission beam without causing a damage to any of the plurality of transducers, or a component in mechanical and/or electrical contact with it.

According to the present invention there is provided a method and apparatus as set forth in the appended claims. Other features of the invention will be apparent from the dependent claims, and the description which follows.

According to a first aspect of the invention, there is provided a method of forming a transmission beam with a transducer array comprising a plurality of transducers, the method comprising: receiving at least one desired property for an intended transmission beam; determining an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array; and generating the transmission beam using the optimised operation parameter on the transducer array.

Suitably, the method may further comprise a step of generating the array model before the receiving the at least one desired property for the intended transmission beam.

Suitably, the determining the optimised operation parameter may be performed based on: the at least one transducer protection property so that the transducer is protected from a damage caused by an excessive operation parameter applied to the transducer; the at least one beam property and the at least one desired property to determine the at least one transducer protection property using the array model; and the at least one desired property so that the generated transmission beam formed with the optimised operation parameter is the same as, or the nearest to, the intended transmission beam without damaging the transducer.

Suitably, the optimised operation parameter may comprise at least one of a maximum voltage, a maximum current and a maximum power input to the transducer. Suitably, the excessive operation parameter may comprise at least one of excessively high voltage, current and power that causes permanent damage to the transducer.

Suitably, the transducer array may be a part of a sonar; the transmission beam may be an acoustic wave for the sonar; and the receiving the at least one desired property may comprise receiving a request to transmit the acoustic wave of a predetermined modulation type; and the request may comprise a frequency and a timing parameter for the predetermined modulation type, a particular steer direction of the transducer array, and an acoustic source level.

Suitably, the transducer array may be positioned inside a marine transport such as a torpedo, a submarine or any other type of a transport for use under or on the water; and the request may further comprise information about an available power within the marine transport during the step of generating the transmission beam, restricted by at least one of a speed of a movement of the marine transport, a power output from a power source within the marine transport, and a position of the marine transport.

Suitably, the array model may comprise a 3D lookup table for different combinations of the at least one beam property and the at least one transducer protection property; the at least one beam property may comprise a transmission beam type, a directivity index DI, an efficiency $\xi$ of the transducer array, a conductance G, a frequency of the transmission beam, and a steer direction of the transmission beam; and the at least one transducer protection property may comprise a maximum voltage $V_{MAX}$.

Suitably, the step of determining the optimised operation parameter may comprise steps of: calculating a root mean square sound pressure level SPL from the acoustic source level from the request; determining a maximum power level $W_{MAX\_TDCR}$ for the transducer by setting the maximum power level $W_{MAX\_TDCR}$ as the minimum value between a maximum available power calculated using the information about the available power within the marine transport from the request, and an absolute maximum power calculated using a duration of the acoustic wave from the request and a predetermined maximum duty cycle for a beam transmission whilst avoiding overheating of the transducer when at a predetermined high power calculated from the information from the request; determining an instantaneous frequency for the transducer for forming the acoustic wave calculated using the predetermined modulation type and timing parameter from the request; determining a required peak voltage $V_{MAX\_NOM}$ for the determined instantaneous frequency as a function of the conductance G, a beam shading factor, and the efficiency $\xi$ of the transducer array obtained from the 3D lookup table; and setting the optimised operation parameter for the transducer as the required peak voltage $V_{MAX\_NOM}$ if the required peak voltage $V_{MAX\_NOM}$ is smaller than the maximum voltage $V_{MAX}$ at the determined instantaneous frequency, and as the maximum voltage $V_{MAX}$ if the required peak voltage $V_{MAX\_NOM}$ is not smaller than the maximum voltage $V_{MAX}$ at the determined instantaneous frequency.

According to a second aspect of the invention, there is provided a system for forming a transmission beam, the system comprising: a transducer array comprising a plurality of transducers arranged to form the transmission beam; a receiver arranged to receive at least one desired property for an intended transmission beam; and a processor arranged to determine an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array, and generate the transmission beam using the optimised operation parameter on the transducer array.

Suitably, the system may further comprise: a storage for storing the array model; and an external processor communicable with the system, wherein the external processor is arranged to, before the receiving the at least one desired property for the intended transmission beam at the processor of the system, generate the array model and communicate the generated array model to the storage, wherein the processor is arranged to access the generated array model in the storage when determining the optimised operation parameter.

Suitably, the system may further comprise a storage for storing the array model, wherein the processor is arranged to: generate the array model before the receiving the at least one desired property for the intended transmission beam at the receiver of the system; store the generated array model in the storage; and access the generated array model in the storage when determining the optimised operation parameter.

Suitably, the transducer array may be a part of a sonar; the transmission beam may be an acoustic wave for the sonar; the receiving the at least one desired property may comprise receiving a request to transmit the acoustic wave of a predetermined modulation type; and the request may comprise a frequency and a timing parameter for the predetermined modulation type, a particular steer direction of the transducer array, and an acoustic source level.

Suitably, the transducer array may be positioned inside a marine transport such as a torpedo, a submarine or any other type of a transport for use under or on the water; and the request may further comprise information about an available power within the marine transport during the step of generating the transmission beam, restricted by at least one of a speed of a movement of the marine transport, a power output from a power source within the marine transport, and a position of the marine transport.

According to a third aspect of the invention, there is provided a computer readable medium storing a computer programme to operate a method according to the first aspect of the invention.

For a better understanding of the invention, and to show how embodiments of the same may be carried into effect, reference will now be made, by way of example, to the accompanying diagrammatic drawings in which.

One of the aims of embodiments of the present invention is to provide for a method or a system for forming a transmission beam wherein the method or the system is capable of forming the transmission beam without causing a damage to any of the plurality of transducers, or a component in mechanical and/or electrical contact with it. This involves determining a set of parameters for forming the transmission beam which ensures the transmission beam having the desired properties, or a transmission beam having as near the desired properties as possible, is generated without causing any damage.

In order to make this determination, the plurality of transducers and components thereof need to be modelled. All models used in the embodiments of the present invention described herein are created and/or used under the boundary condition of having a single frequency steady-state sinusoidal signal. However, it is understood that other boundary conditions may be applied instead, or in addition to, the single frequency steady-state sinusoidal signal as long as the models are capable of approximating the practical conditions under which the modelled parameters such as physical properties and operation parameters are used in the method or system for forming a transmission beam.

Various physical properties and/or operation parameters used herein, such as a transmitter signal $V_{IN}$, a voltage V or Vo, a current I, force F, velocity U, and others, are represented in their respective Root Mean Square (RMS) values in the models described herein. However, it is understood that any other statistical measures suitable for comparing and/or calculating these physical properties and/or operation parameters may be used instead to achieve the same effect.

A model or an array model is a set of data that represents a relationship between at least two types of parameters. According to an embodiment, an array model is represented by a table or a matrix comprising maximum voltage values as entries or elements, wherein a row or a column relates to a different parameter for defining a beam shape or direction such as an azimuth steer angle, an elevation steer angle, a conductance G and/or an efficiency of a transducer array. It is understood that according to an alternative embodiment, an array model is represented by another type of data format that is capable of storing a set of data whilst representing a relationship between at least two types of parameters related to that set of data.

Figure 1:
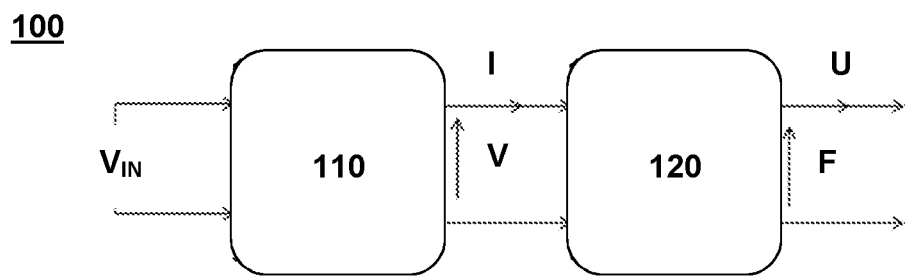
FIG. 1 shows an array model according to an embodiment of the present invention.

FIG. 1 shows an array model 100 according to an embodiment of the present invention, wherein the array model 100 comprises a transmitter model, a circuitry model 110 and a transducer model 120.

The transmitter model models a single transmitter as an ideal voltage source which outputs a transmitter signal $V_{IN}$.

The transmitter signal $V_{IN}$ output from the transmitter model is then applied to a circuitry model 110, which is a two-port model representing an electrical characteristics of a combination of an amplifier's output impedance and an interface circuitry between the amplifier output and a transducer. The interface circuitry comprises components such as a transformer for driving a transducer. According to an embodiment, if a transducer array comprising a plurality of transducers is connected to the transmitter via the interface circuitry, a plurality of amplifiers are used, each amplifier arranged via the interface circuitry to drive a single transducer of the transducer array. It is understood that according to an alternative embodiment, the amplifier and the transducer may not have the one-to-one relationship describe above but the interface circuitry provides driving signal to each transducer, and the circuitry model 110 takes this into account.

The transducer model 120 is a two-port model with an electrical interface (voltage V and current I are input) at its input ports from the transmitter side via the circuitry model 110, and a mechanical interface at its output ports outputting a transducer output force F and a transducer head velocity U, which are related to operational parameters for driving the transducer. According to an embodiment, the transducer model 120 is represented by a 2×2 matrix.

When a transducer array comprising a plurality of transducers is used to form a transmission beam, mutual impedances among the channels connected to the plurality of transducers have an effect on the overall performance of the transducer array. Such mutual impedance effect on the transducer array can be modelled using a mutual acoustic impedance model similar to that described in "Mutual Acoustic Impedance between Radiators in an Infinite Rigid Plane" by Pritchard, R. L. published in The Journal of the Acoustical Society of America, vol. 32, issue 6, p. 730 in 1960.

According to an embodiment, the mutual acoustic impedance model is a N×N matrix (where N is the number of transducers) representing N interacting acoustic loads of the transducer array.

Figure 2:
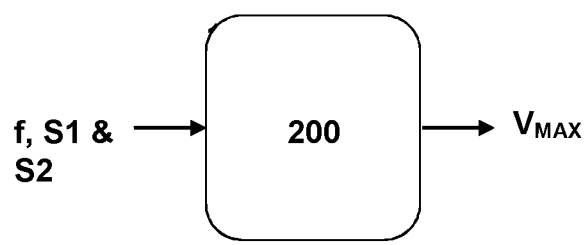
FIG. 2 shows an array model incorporating an acoustic load model according to an embodiment of the present invention.

FIG. 2 shows an array model 200 incorporating an acoustic load model according to an embodiment of the present invention, wherein the acoustic load model is the mutual acoustic impedance model representing the acoustic load interactions between each channel connected to the plurality of transducers of the transducer array.

The array model 200 combines the array model 100 of FIG. 1, i.e. the transmitter model, the circuitry model 110 and the transducer model 120 of FIG. 1, with the acoustic load model, to form a new N×N trans-impedance matrix. When information about an intended transmission beam is input to the array model 200, the array model 200 is arranged to output a maximum transmitter voltage $V_{MAX}$ for the transducer array for that particular intended transmission beam. The intended transmission beam is the desired transmission beam requested to be generated from the transducer array.

The information about the intended transmission beam relates to at least one desired property of the transmission beam which defines characteristics of the intended transmission beam so that the generated transmission beam from the transducer array is suitable and/or effective for performing its function, for example a detection function if implemented in a sonar system. To achieve this, the input at least one desired property comprises a frequency f and a particular beam steer direction parameters such as an azimuth steer angle S1 and an elevation steer angle S2. According to an embodiment, a desired amplitude A (a desired acoustic source level) for that particular beam can also be input.

According to an alternative embodiment, only the frequency f and the beam steer direction (the azimuth steer angle S1 and the elevation steer angle S2) are input with the desired amplitude A of the intended transmission beam being as largest amplitude A as possible without causing any permanent damage to the transducer array.

The array model 200 then enables determining the maximum transmitter voltage $V_{MAX}$ that, when used to drive the transducer array, will enable the transducer array to generate the intended transmission beam, or at least a transmission beam that has characteristics most resembling the intended transmission beam, whilst ensuring that none of high limits for driving voltages, currents and/or powers of all the transducers are exceeded if the maximum transmitter voltage $V_{MAX}$ is used to drive the transducer array.

According to an embodiment, the determined maximum transmitter voltage $V_{MAX}$ drives the transducer array so that the transducer array generates a transmission beam that has all the characteristics of the intended transmission beam, for example the desired frequency f and the desired beam steer direction S1 and S2, except the amplitude A. This is because the input desired amplitude A of the intended transmission beam is as largest amplitude as possible, which is then restricted by the limitations of the transducer array when the maximum transmitter voltage $V_{MAX}$ is determined using the array model.

According to an alternative embodiment, the determined maximum transmitter voltage $V_{MAX}$ drives the transducer array so that the transducer array generates a transmission beam that has all the characteristics of the intended transmission beam including the desired frequency f, the desired beam steer direction S1 and S2, and the desired amplitude A. According to an embodiment, to obtain the array model 200, a matrix equation of the following can be constructed for a given vector of transmitter voltages (weighted in phase and amplitude as required for a particular transmission beam) for driving the transducer array:

$$V = P \cdot U$$

wherein: V is a column vector with N elements representing transmitter voltages in V (in complex number to take into account of any phase differences as well);

U is a column vector with N elements representing transducer head velocities in ms$^{-1}$ (complex number to take into account of any phase differences as well; and P is the N×N trans-impedance matrix (elements have unit of V/(ms$^{-1}$)).

This matrix equation $V = P \cdot U$ can then be solved for a single frequency, whereby U vector of transducer head velocities can be determined. With further substitutions, other parameters for forming the transmission beam and controlling the transducer array can be determined from this solution. When similar equations are solved for all required frequencies, i.e. frequencies expected to be used in the transmission beam forming, the collection of these solutions forms the array model 200.

The following is an overview of a first process for forming, or generating, the array model 200, whereby the first process outputs a plurality of lookup tables LUT as a representation of the array model 200 according to an embodiment of the present invention. The first process is run as a computer simulation before any real-time use of the lookup table LUT to form a physical transmission beam. Each LUT is for a given transmission beam shading set, i.e. for a given transducer array for generating a transmission beam of a given frequency. The first process is used to form, or generate, the array model 200 so that the formed, or generated, array model can be used by a second process for determining an optimised operation parameter for an intended transmission beam, wherein the second process is performed in real-time as and when a request for a particular intended transmission beam is received.

The second process is performed to determine the optimised operation parameter which is optimised for generating a transmission beam that is the same as, or nearest to if under a less than ideal circumstances, the intended transmission beam.

In the following it is assumed that at least one element, i.e. at least one transducer, has a unity shading factor (typically, a transducer located near or at the centre of the transducer array is unity shaded). A unity shaded channel for the transducer with the unity shading factor is driven with a voltage Vo, and all other channels (connected to the rest of the transducers of the transducer array) are driven at Vo or lower, calculated as a ratio or a multiple of Vo and a corresponding shading factor for that particular transducer. As there may be a phase difference between some of the rest of the transducers and the unity shaded channel, the voltage amplitudes are considered as complex values.

The first process for forming, or generating, the array model is performed with the following parameters and boundary conditions.

A shading factor is a weighting factor applicable to a driving voltage of each transducer of a transducer array, when the driving voltage of the transducer is compared with the driving voltage Vo of the unity shading factor transducer. The overall effect of applying the corresponding shading factors to the driving voltages of all the transducers is that the transducer array generates a transmission beam of a defined shape and direction for a given frequency, whilst reducing side lobes and broadening main lobe of the transmission beam.

A predetermined voltage $V_{LIM}$ is a high level which is guaranteed to drive at least one of the plurality of the transducers above the level at which the current, the voltage and the power would all be above the limits. According to an embodiment, the predetermined voltage $V_{LIM}$ is chosen arbitrarily. According to an alternative embodiment, the predetermined voltage $V_{LIM}$ is chosen so that it is at least ten times a typical maximum voltage value a typical transducer of the transducer array can withstand before suffering a permanent damage.

According to an embodiment, the first process uses a set of predetermined values that are maximum permissible values for each transducer, for example a maximum transducer power for an individual transducer $PT_{MAX}$, a maximum transducer voltage for an individual transducer $VT_{MAX}$ and a maximum transducer current for an individual transducer $IT_{MAX}$. As each transducer may have different characteristics, for example due to small variations in the electrical performance of components of the individual transducers and/or the array interactions, these values tend to vary between one transducer to another.

It is understood that according to an alternative embodiment, all the transducers of the transducer array are assumed to behave the same, and therefore have the same set of predetermined values that are maximum permissible values for each of the transducers, for example all the transducers have the same maximum transducer power for an individual transducer $PT_{MAX}$, the same maximum transducer voltage for an individual transducer $VT_{MAX}$ and the same maximum transducer current for an individual transducer $IT_{MAX}$.

For simplicity, the embodiment described herein assumes that all the transducers of the transducer array behave the same so that they have the same set of predetermined values for the maximum permissible values. According to an embodiment, the maximum transducer power for an individual transducer $PT_{MAX}$, the maximum transducer voltage for an individual transducer $VT_{MAX}$ and the maximum transducer current for an individual transducer $IT_{MAX}$ are determined from the electrical components and/or the design of the transducer itself, i.e. from the maximum rating for power, voltage and current of that particular type of transducer. According to an embodiment, the maximum transducer power for an individual transducer $PT_{MAX}$, the maximum transducer voltage for an individual transducer $VT_{MAX}$ and the maximum transducer current for an individual transducer $IT_{MAX}$ are determined by testing another set of identical type of transducers.

The following first process for forming, or generating, the array model 200 is then performed for each frequency and transmission beam steer direction selected from a set of required frequencies and a set of transmission beam steer directions:

(i) A computer simulation is run with the array model 200 having a boundary condition of $Vo=V_{LIM}$. This simulation simulates what happens when the at least one transducer, which has a unity shading factor, is driven by a voltage Vo on the unity shaded channel for the at least one transducer, and when all the other channels (connected to the rest of the transducers of the transducer array) are driven at Vo or lower, with each driving voltage determined by a ratio or a shading factor applicable that particular transducer.

(ii) During the computer simulation, a power value, a voltage value and a current value are calculated for each transducer using the array model, and a maximum transducer power for all transducers $PA_{MAX}$, a maximum transducer voltage for all transducers $VA_{MAX}$ and a maximum transducer current for all transducer $IA_{MAX}$ are determined from the calculated voltage, current and power values for the transducers, i.e. from the simulation. These are the absolute maximum power, voltage and current values, when the power, voltage and current values are calculated for all the transducers of the transducer array, i.e. the largest power, voltage and current values applied or experienced by any transducer of the transducer array.

Depending on the circumstances, all three maximum values $PA_{MAX}$, $VA_{MAX}$, $IA_{MAX}$ may not relate to the same single transducer or the same channel driving it due to interactions among the transducers or the channels. For example, due to interaction effects, a transducer driven with a higher voltage does not necessarily experience a higher current than the other transducers driven with a lower voltage because the transmission beam may be steered in a non-symmetric way.

(iii) Then, three ratios are calculated:

$$K_V = \frac{VT_{MAX}}{VA_{MAX}}$$

$$K_I = \frac{IT_{MAX}}{IA_{MAX}}$$

$$K_P = \sqrt{\frac{PT_{MAX}}{PA_{MAX}}}$$

These three ratios are less than one because of the use of the high drive voltage $Vo=V_{LIM}$.

The maximum transducer power for an individual transducer $PT_{MAX}$, the maximum transducer voltage for an individual transducer $VT_{MAX}$ and the maximum transducer current for an individual transducer $IT_{MAX}$ are a set of predetermined values that are maximum permissible values for each transducer.

The maximum transducer power for all transducers $PA_{MAX}$, the maximum transducer voltage for all transducers $VA_{MAX}$ and the maximum transducer current for all transducer $IA_{MAX}$ are determined by calculating voltage, current and power values for the transducers from the simulation run with the predetermined high level voltage $V_{LIM}$, which is chosen so that at least one of the plurality of the transducers is driven above the level at which the current, the voltage and the power are all beyond limits, i.e. above the maximum transducer power for that individual transducer $PT_{MAX}$, the maximum transducer voltage for that individual transducer $VT_{MAX}$ and the maximum transducer current for that individual transducer $IT_{MAX}$.

Therefore, as long as the predetermined voltage $V_{LIM}$ is sufficiently large, the three ratios are always less than one.

According to an embodiment, the predetermined voltage $V_{LIM}$ is chosen arbitrarily and the computer simulation is run initially with this arbitrary value. Then, if any one of $K_V$, $K_I$ and $K_P$ is equal to, or more than, one, then the computer simulation is re-run with a higher predetermined voltage $V_{LIM}$ value until all three ratios $K_V$, $K_I$ and $K_P$ are less than one.

(iv) A minimum value among $K_V$, $K_I$ and $K_P$ is chosen or calculated, and the minimum value is multiplied by $Vo=V_{LIM}$ to determine a maximum transmitter voltage $V_{MAX}$ that will ensure that none of the high limits for the driving voltages of all the transducers are exceeded if the maximum transmitter voltage $V_{MAX}$ is used to drive the at least one transducer of the transducer array that has a unity shading factor:

$$V_{MAX}=V_{LIM}\cdot\min(K_V,K_I,K_P)$$

It is understood that according to another embodiment, instead of enabling determination of the maximum transmitter voltage $V_{MAX}$, the array model 200 enables determination of a maximum transmitter power $P_{MAX}$, a maximum transmitter current $I_{MAX}$ or a maximum value of any other transmitter operation parameter for driving the transducers, and the first process steps (i)-(iv) are performed in relation to that particular type of transmitter operation parameter to determine the maximum transmitter operation parameter such as the maximum transmitter power $P_{MAX}$ or the maximum transmitter current $I_{MAX}$. For example, if the array model 200 is used to model a system wherein a current source drives the transducer array, the maximum transmitter current $I_{MAX}$ may be determined so that the determined maximum transmitter current $I_{MAX}$ can be applied to the transducer array more readily.

It is also understood that according to yet another embodiment, the array model 200 enables determination of more than one type of maximum transmitter operation parameters, for example the maximum transmitter voltage $V_{MAX}$ and the maximum transmitter power $P_{MAX}$ or current $I_{MAX}$, for driving the transducers, and the first process steps (i)-(iv) are performed to determine the same whilst ensuring none of the high limits for all the types of the relevant transmitter operation parameters used for driving all the transducers are exceeded.

The first process is repeated for each frequency from a set of frequencies, azimuth steers, and elevation steers for each transmission beam type. The result or outcome, for each transmission beam type, is therefore a 3-dimensional LUT, which is then used, by the second process for determining an optimised operation parameter for generating a transmission beam, to determine the optimised operation parameter for any given boundary condition such as the desired transmission beam shape, the desired frequency, and the desired beam steer direction. The lookup tables LUT are stored so that they can be accessed by a sonar system running the second process in real-time during generation or transmission of an acoustic beam. Use of such a simple data format as the lookup table, reduces any complexity involved in forming the acoustic beam for the transmission in real time.

According to an embodiment, the process of generating a LUT using the first process described above is programmed using a programming language or a mathematics package capable of solving matrix equations such as a MATLAB® program, which then generates the LUT in a suitable format for a direct insertion into any computer program used for the real-time transmission beam forming, for example a compiled language such as C++.

The LUT comprising the maximum transmitter voltage $V_{MAX}$ values provides the sonar system with the maximum transmitter voltage that can be applied to a transducer of the transducer array when forming an intended transmission beam of a given beam type, frequency and beam steer direction without causing any damage to the transducer array, which can occur from excessive power, current or voltage being applied to the transducer.

According to an embodiment, the method of forming a transmission beam uses time-delay beam forming. A frequency f, an azimuth steer angle S1, and an elevation steer angle S2 for the intended transmission beam are used as inputs for the method of forming a transmission beam with a transducer array comprising a plurality of transducers.

The method of forming a transmission beam then performs the second process for determining an optimised operation parameter for the intended transmission beam based on these inputs and the array model 200 generated by the first process. By referencing these inputs with the array model, for example the LUT, the second process determines the maximum transmitter voltage $V_{MAX}$ for the intended transmission beam.

The method of forming a transmission beam then calculates a required time delay for forming the intended transmission beam with the maximum transmitter voltage $V_{MAX}$ to generate a transmission beam using the maximum transmitter voltage $V_{MAX}$ on at least one transducer of the transducer array, which has a unity shading factor, with the rest of the transducers driven by transmitter voltages in accordance with their shading factors.

The use of time-delay beam forming, instead of phase-shift beam forming, enables the transmission beam to be steered in a frequency-independent manner since if the phase-shift beam forming is used, the transmission beam would be distorted when the frequency is swept, i.e. when the frequency is changed during a beam transmission.

However, it is understood that depending on the application, according to an alternative embodiment the method of forming a transmission beam may use phase-shift beam forming, wherein the method calculates a required phase instead of the required time delay.

According to an embodiment, a LUT comprises $V_{MAX}$ values for each transmission beam type, frequency, and beam steer direction parameters (for example azimuth steer angles and elevation steer angles). Since there are an infinite number of permutations of the frequency and the beam steer direction parameters, storing all the $V_{MAX}$ values for all the permutations is impractical in a LUT format. So the LUT stores $V_{MAX}$ values at discrete intervals of the frequency, the azimuth steer angle and the elevation steer angle.

Then, the second process determines the maximum transmitter voltage $V_{MAX}$ using a trilinear interpolation on the frequency, the azimuth steer angle and the elevation steer angle. It is understood that any other type of interpolation method may be used to determine and obtain the required maximum transmitter voltage $V_{MAX}$.

By only storing $V_{MAX}$ values at certain discrete intervals of the frequency, the azimuth steer angle and the elevation steer angle, the second process can be performed more efficiently since the size of LUT is reduced, whereby required resources for storing the LUT and accessing the data therein are reduced.

Figure 3:
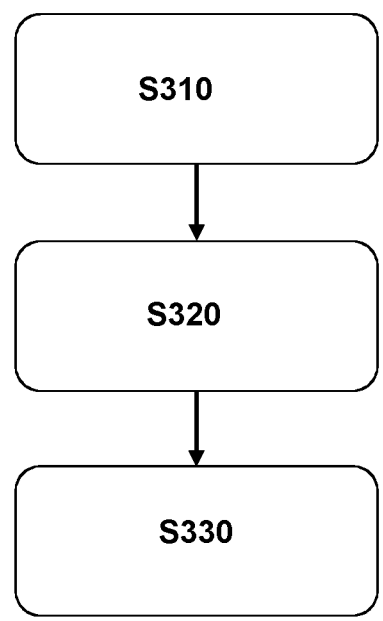
FIG. 3 shows a method of forming a transmission beam with a transducer array according to an embodiment of the present invention.

FIG. 3 shows a method of forming a transmission beam with a transducer array comprising a plurality of transducers, according to an embodiment of the present invention, wherein the method comprises: receiving at least one desired property for an intended transmission beam at S310; determining an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array at S320; and generating the transmission beam using the optimised operation parameter on the transducer array at S330.

The at least one desired property for an intended transmission beam at S310 is received in a request comprising at least one or more of: an acoustic source level of the intended transmission beam such as an amplitude A; a frequency f of the intended transmission beam; a transmission beam steer (for example an azimuth steer angle S1, an elevation steer angle S2 or a directivity index DI) of the intended transmission beam; and a waveform modulation type of the intended transmission beam. The request is then used to determine, then to provide, to the array model, the desired properties such as the particular beam steer direction of the intended transmission beam, and the desired frequency f and amplitude A (a desired acoustic source level) for that particular beam as discussed above in relation to FIG. 2. The request also enables calculation of the required time delay for achieving the at least one desired property with the generated transmitted beam.

For example, when the transducer array is a part of a sonar system, the intended transmission beam is an acoustic wave used by the sonar system. So the receiving the at least one desired property at S310 comprises receiving a request to transmit the acoustic wave of a predetermined modulation type, and the request also comprises a frequency and a timing parameter for the predetermined modulation type, a particular steer direction of the transducer array, and an acoustic source level.

According to an embodiment, the request comprises a transmission modulation parameter for the predetermined modulation type such as at least one of start frequency, end frequency, type of frequency modulation, and type of amplitude modulation, a particular steer direction such as an azimuth steer and an elevation steer, and a desired acoustic source level.

At S320, based on the received at least one desired property from S310, the array model 200 of FIG. 2 and the second process for determining an optimised operation parameter for an intended transmission beam are used to determine the maximum transmitter voltage $V_{MAX}$ that, when used to drive the transducer array, will enable the transducer array to generate the intended transmission beam, or at least a nearly intended transmission beam that has characteristics most resembling the intended transmission beam, whilst ensuring that none of high limits for driving voltages, currents and powers of all the transducers is exceeded if the maximum transmitter voltage $V_{MAX}$ is used to drive the transducer array.

The at least one desired property is used by the array model 200 so that the generated transmission beam formed with the optimised operation parameter is the same as, or the nearest to (the nearly intended transmission beam), the intended transmission beam without damaging the transducer array.

According to an embodiment, when used in a sonar system, the method also ensures the nearly intended transmission beam possesses all the at least one desired property except the desired amplitude, i.e. the acoustic source level. This is because in a sonar system, the transducer arrays are often requested to generate a transmission beam with as large amplitude (acoustic source level) as possible whilst ensuring all the other desired properties of the intended transmission beam are present in the generated transmission beam. By generating such a nearly intended transmission beam, the method enables generation of the nearly intended transmission beam with as large amplitude as possible.

The at least one beam property comprises at least one or more of: a set of frequencies for the transmission beam, a transmission beam type; a directivity index DI; an efficiency $\xi$ of the transducer array; a conductance G; a frequency f of the transmission beam; and a steer direction of the transmission beam (for example, azimuth steer angles S1 and elevation steer angles S2 for each frequency f).

The at least one transducer protection property comprises at least one or more of: a maximum transmitter voltage $V_{MAX}$, a maximum transmitter current $I_{MAX}$, and a maximum transmitter power $P_{MAX}$. The determining the optimised operation parameter is performed on the at least one transducer protection property so that the transducer is protected from a damage caused by an excessive operation parameter being applied to the transducer. The excessive operation parameter comprises at least one of excessively high voltage, current and power which can cause temporary and/or permanent damage to the transducer.

The array model 200 models the relationship between these two sets of property parameters, namely the at least one beam property and the at least one transducer protection property. This relationship is stored in a format of a lookup table LUT, and when the at least one desired property for the intended transmission beam is received, LUT is used to reference the at least one beam property with the at least one desired property, whereby a transducer protection property (such as the maximum transmitter voltage $V_{MAX}$) for that particular at least one desired property is determined from the relationship between the two sets of property parameters as apparent from the first process for forming, or generating, the array model 200 described above in relation to FIG. 2.

The determined maximum transmitter voltage $V_{MAX}$ is then used to determine an optimised operation parameter for driving each transducer of the transducer array, whereby the transducer array generates the intended or the nearly intended transmission beam at S330.

The optimised operation parameter for driving each transducer comprises the determined maximum transmitter voltage $V_{MAX}$ for at least one unity shading factor transducer of the transducer array, and at least one weighted maximum transmitter voltage for the rest of the transducers of the transducer array, i.e. for the non-unity shading factor transducers. According to an embodiment, the way how the plurality of transducers are arranged in the transducer array means that the at least one unity shading factor transducer of the transducer array is normally positioned at, or near, a central position of the transducer array. Each one of the at least one weighted maximum transmitter voltage is a maximum transmitter voltage for a corresponding non-unity shading factor transducer of the transducer array, wherein the weighted maximum transmitter voltage is proportional to the determined maximum transmitter voltage $V_{MAX}$.

Figure 4:
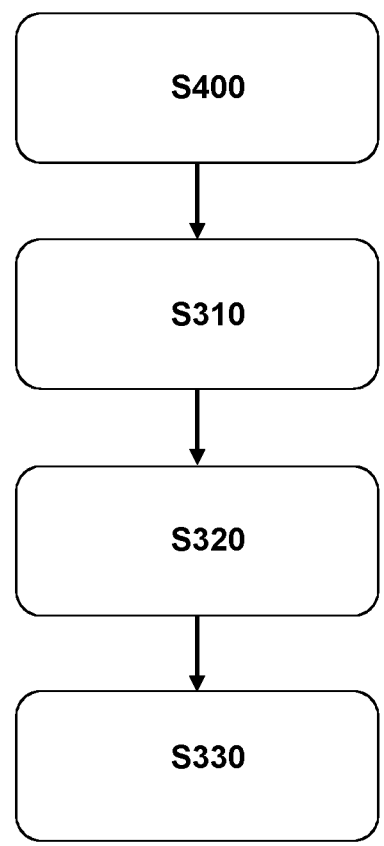
FIG. 4 shows a method of forming a transmission beam with a transducer array according to an embodiment of the present invention.

FIG. 4 shows the method of forming a transmission beam with a transducer array comprising a plurality of transducers of FIG. 3 according to another embodiment of the present invention, wherein the method further comprises a step of generating the array model before the receiving the at least one desired property for the intended transmission beam at S400.

The array model 200 in the form a lookup table LUT is generated, or formed, using the first process described in relation to FIG. 2, and stored for use later at S400. When the at least one desired property for the intended transmission beam is received at S310, the stored LUT is accessed, and used to determine the optimised operation parameter at S320.

As discussed above, generating the array model 200 can be a resource intensive process which requires significant processing power, memory space and time. However, the method of forming a transmission beam with a transducer array may need to be run on a marine transport, where the method needs to generate the transmission beam in a very short period of time, and the available resources are very limited. So the generating the array model 200 before the transmission beam is actually requested or generated in real-time can be beneficial. That is, performing the first process for forming, or generating, the array model prior to the step S310 of the receiving the at least one desired property for the intended transmission beam can be useful since this enables the resource intensive first process to be performed beforehand, not in real-time when an immediate or a prompt generation of the transmission beam is needed.

According to an embodiment, the array model 200 is generated at a spatially and temporally different location and period in time from the rest of the steps of the method of forming a transmission beam.

For example, the transducer array is positioned inside a marine transport such as a torpedo, a submarine or any other type of a transport for use under or on the water, and the array model 200 is generated elsewhere where better and more efficient resources are available. The generated array model 200 is then communicated to the marine transport for storage so that the array model 200 is available for use later with the rest of the steps of the method of forming a transmission beam, for example for use when performing the second process for determining an optimised operation parameter for an intended transmission beam.

Figure 5:
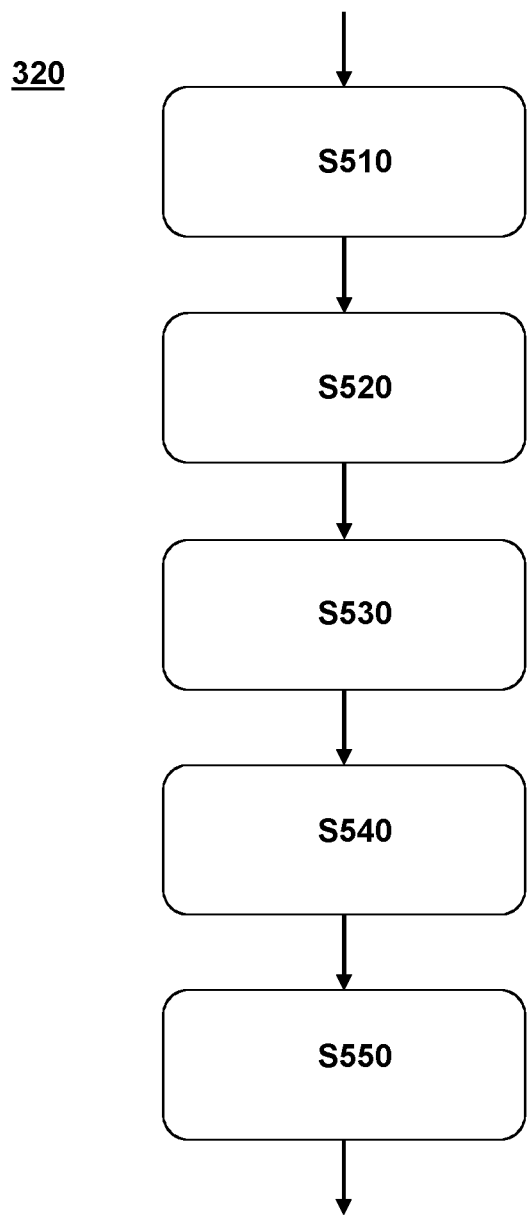
FIG. 5 shows method steps for determining an optimised operation parameter for a transducer of the transducer array in the method of FIG. 3 or 4 according to an embodiment of the present invention.

FIG. 5 shows method steps for determining an optimised operation parameter for a transducer of the transducer array in the method of FIG. 3 or 4 according to an embodiment of the present invention, wherein the transducer array is positioned inside a marine transport such as a torpedo, a submarine or any other type of a transport for use under or on the water, and the received request at S310 also comprises information about an available power within the marine transport during the step of generating the transmission beam, the available power being restricted by at least one of a speed of a movement of the marine transport, a power output from a power source within the marine transport, and a position of the marine transport.

According to an embodiment, the information about an available power comprises an engine speed of an engine for propelling the marine transport so that the engine speed is used to determine the available power from an alternator driven from the engine shaft, when the alternator functions as a primary power source.

The step S320 of determining the optimised operation parameter comprises steps of: calculating a root mean square sound pressure level SPL from the acoustic source level from the request at S510; determining a maximum power level $W_{MAX\_TDCR}$ for the transducer by setting the maximum power level $W_{MAX\_TDCR}$ as the minimum value between a maximum available power calculated using the information about the available power within the marine transport from the request, and an absolute maximum power calculated using a duration of the acoustic wave from the request and a predetermined maximum duty cycle for a beam transmission whilst avoiding overheating of the transducer when at a predetermined high power calculated from the information from the request at S520; determining an instantaneous frequency for the transducer for forming the acoustic wave calculated using the predetermined modulation type and timing parameter from the request at S530; determining a required peak voltage $V_{MAX\_NOM}$ for the determined instantaneous frequency as a function of the conductance G, a beam shading factor, and the efficiency $\xi$ of the transducer array obtained from the 3D lookup table at S540; and setting the optimised operation parameter for the transducer as the required peak voltage $V_{MAX\_NOM}$ if the required peak voltage $V_{MAX\_NOM}$ is smaller than the maximum voltage $V_{MAX}$ at the determined instantaneous frequency, and as the maximum voltage $V_{MAX}$ if the required peak voltage $V_{MAX\_NOM}$ is not smaller than the maximum voltage $V_{MAX}$ at the determined instantaneous frequency at S550.

According to an embodiment, a predetermined maximum duty cycle for a beam transmission whilst avoiding overheating of the transducer when at a predetermined high power is calculated from a time of arrival of the currently received request, a time of arrival of a previously received request, and the required pulse duration.

This enables the method to also take into account of any available power within the marine transport, which can be very limited, whilst ensuring no damage is caused to the transducer array, no excessive power is taken away from other components of the marine transport, when the intended, or at least nearly intended, transmission beam is generated.

FIGS. 6-9 show a system 600 arranged to put into practice the method of forming a transmission beam with a transducer array comprising a plurality of transducers shown in one of FIGS. 3-5. The actual method steps for forming a transmission beam are described in detail in relation to FIGS. 3-5, and hence are omitted below. However, it is understood that the same details described in relation to FIG. 3-5 also apply to the corresponding steps described herein in relation to FIGS. 6-9.

Figure 6:
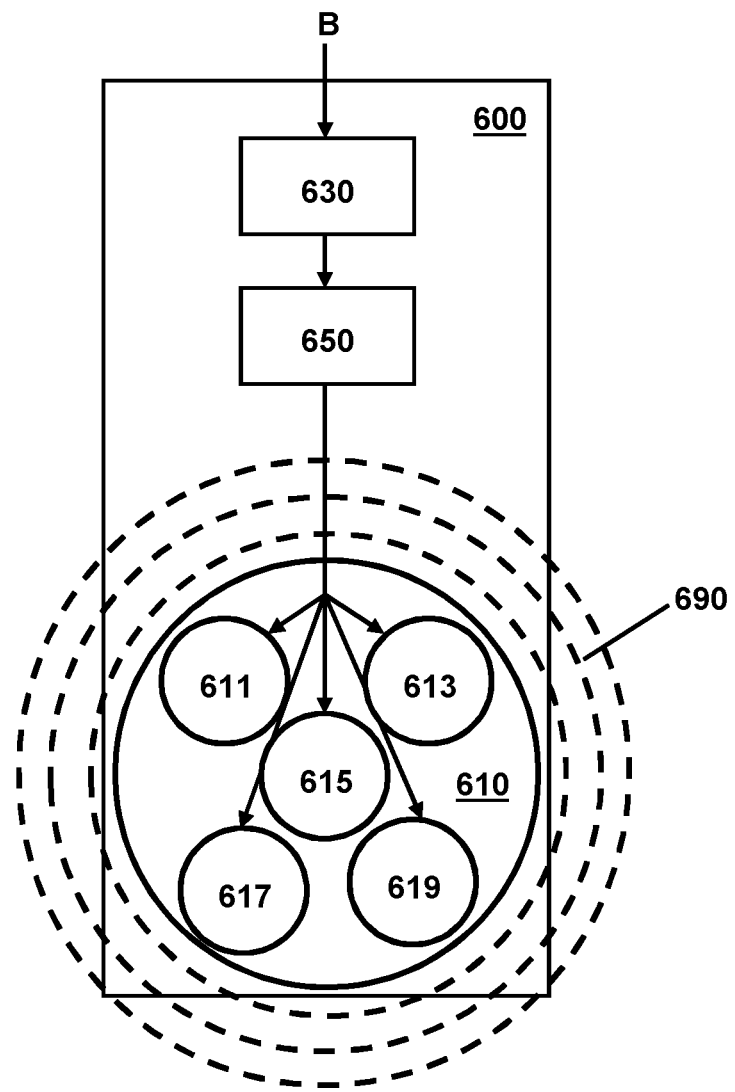
FIG. 6 shows a system for forming a transmission beam according to an embodiment of the present invention.

FIG. 6 shows a system 600 for forming a transmission beam according to an embodiment of the present invention, wherein the system 600 comprises: a transducer array 610 comprising a plurality of transducers 611, 613, 615, 617, 619 arranged to form the transmission beam 690; a receiver 630 arranged to receive at least one desired property B for an intended transmission beam; and a processor 650 arranged to determine an optimised operation parameter for a transducer 611, 613, 615, 617, 619 of the transducer array 610 based on the received at least one desired property B and an array model for modelling a relationship between at least one beam property and at least one transducer protection property whilst taking into account of an acoustic mutual coupling of the plurality of transducers 611, 613, 615, 617, 619 of the transducer array 610, and generate the transmission beam 690 using the optimised operation parameter on the transducer array 610.

Figure 7:
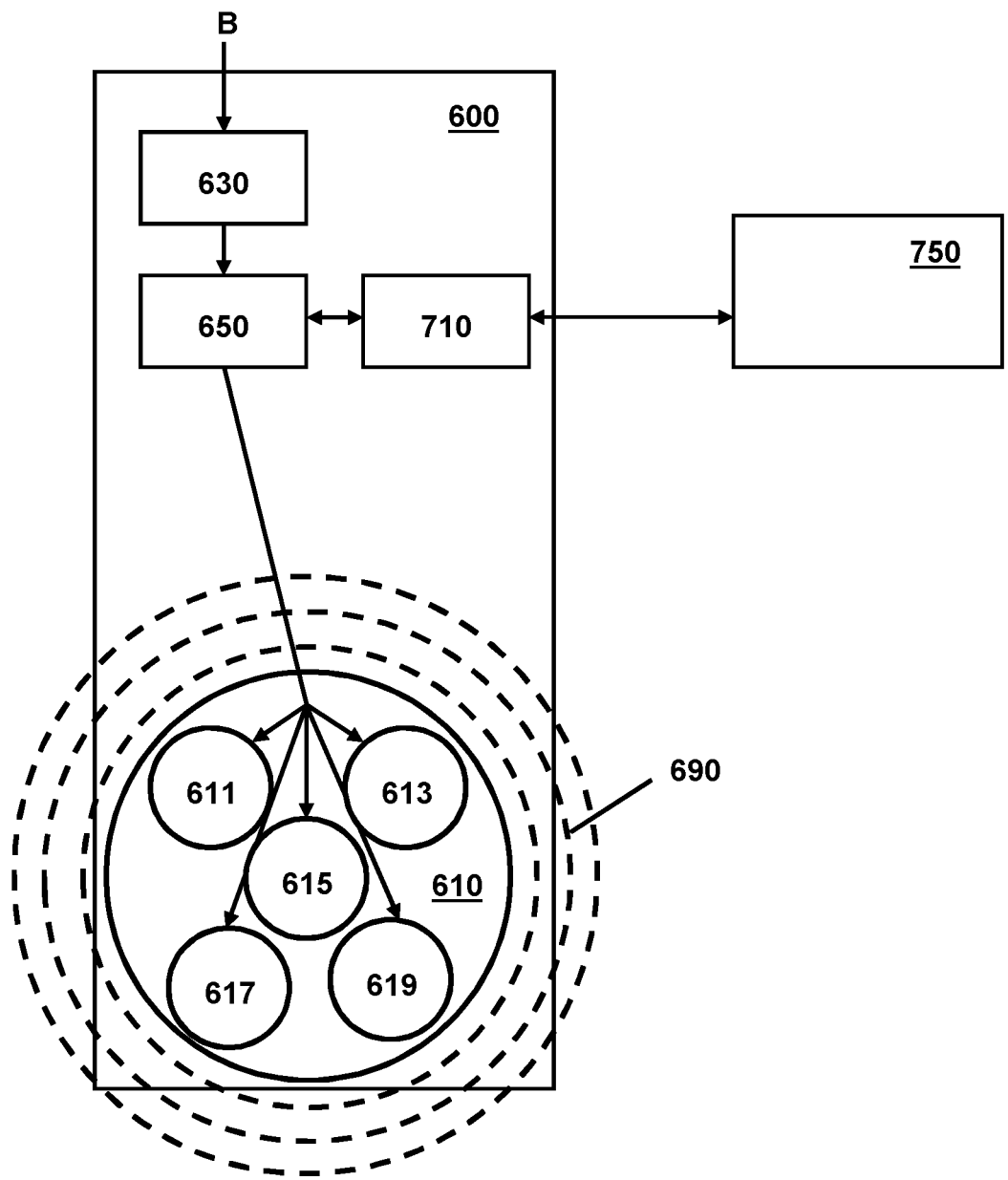
FIG. 7 shows a system for forming a transmission beam according to an embodiment of the present invention.

FIG. 7 shows a system 600 for forming a transmission beam of FIG. 6 according to an embodiment of the present invention, wherein the system 600 further comprise a storage 710 for storing the array model.

According to an embodiment, the processor 650 in the system 600 is arranged to: generate the array model before the receiving the at least one desired property B for the intended transmission beam at the receiver 630 of the system 600; store the generated array model in the storage 710; and access the generated array model in the storage 710 when the at least one desired property B is received, whereby the processor 650 determines the optimised operation parameter with a minimum delay.

By performing the resource intensive and time consuming step of generating the array model beforehand, the system 600 enables prompt generation of the intended, or nearly intended, transmission beam 690 when the at least one desired property B is received at a later time.

According to another embodiment, there is also provided an external processor 750 communicable with the system 600, wherein the external processor 750 is arranged to, before the receiving the at least one desired property B for the intended transmission beam at the processor 650 of the system 600, generate the array model and communicate the generated array model to the storage 710. Then, the processor 650 in the system 600 accesses the generated array model in the storage 710 when the at least one desired property B is received, whereby the processor 650 determines the optimised operation parameter for generating the intended, or nearly intended, transmission beam 690 with a minimum delay.

According to this embodiment, the system 600 and the external processor 750 together constitute an overall system for forming a transmission beam.

By performing the resource intensive and time consuming step of generating the array model beforehand, the system 600 according to this embodiment also enables prompt generation of the intended, or nearly intended, transmission beam 690 when the at least one desired property B is received at a later time.

Further, by performing the resource intensive and time consuming step of generating the array model using the external processor 750, which is spatially separate from the system 600, the system 600 according to this embodiment reduces the amount of processing power and resources required within the system 600 itself so that less bulky and/or powerful hardware can be used in the system 600 itself. This is beneficial when the system 600 for performing the rest of the steps of the method of forming the transmission beam needs to be implemented in a space-restricted marine transport such as a torpedo, a submarine or any other type of a transport for use under or on the water.

Figure 8:
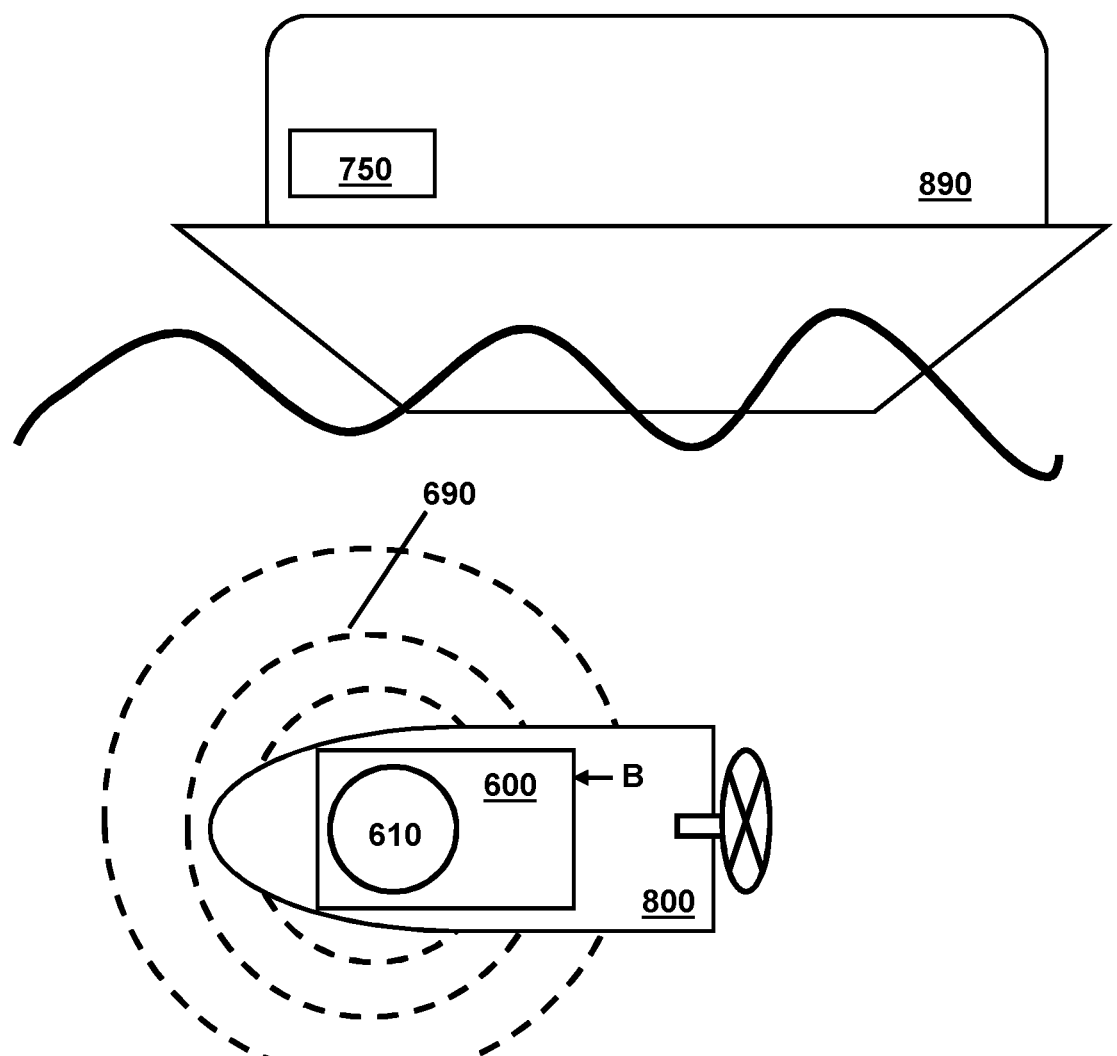
FIG. 8 shows a marine transport employing the system of FIG. 6 or 7 according to an embodiment of the present invention.

FIG. 8 shows a marine transport 800 employing the system 600 of FIG. 6 or 7 according to an embodiment of the present invention.

The marine transport 800 is a torpedo comprising the system 600 of FIG. 6 or 7, which in turn comprises the transducer array 610.

The transducer array 610 is a part of a sonar, and the intended transmission beam is an acoustic wave for the sonar. The receiving the at least one desired property B comprises receiving a request to transmit the acoustic wave of a predetermined modulation type, and the request also comprises a frequency and a timing parameter for the predetermined modulation type, a particular steer direction of the transducer array, and an acoustic source level.

Another marine transport, in the form of a ship 890 is also shown. The ship 890 comprises an external processor 750 described in relation to FIG. 7 so that the external processor 750 can perform the generation of the array model away from the marine transport 800 employing the system 600 of FIG. 7. The external processor 750 communicates the generated array model using any wireless or wired communication methods.

According to an embodiment, the marine transport 800 is tethered to the ship 890 with a wire, and the wire enables communication between the system 600 and the external processor 750.

According to an embodiment, the external processor 750 also communicates with the system 600 of the marine transport 800 whilst the marine transport 800 is in use so that the array model can be generated using and/or updated with physical data collected by the marine transport 800 whilst it is in use, that is the array model may also comprise empirical parameters.

According to an embodiment, the external processor 750 stores the generated array model in a computer readable medium, and the computer readable medium storing the array model is physically transported and installed into the marine transport 800.

Figure 9:
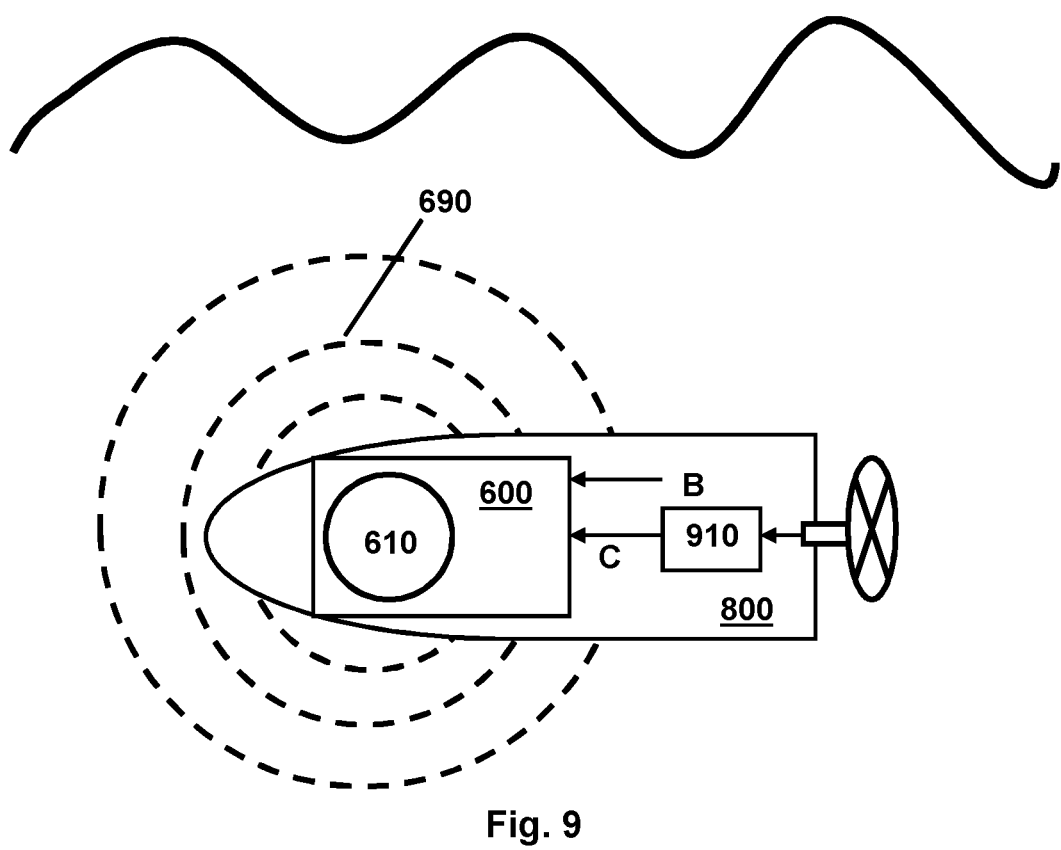
FIG. 9 shows the marine transport of FIG. 8 according to another embodiment of the present invention.

FIG. 9 shows the marine transport 800 of FIG. 8 according to another embodiment of the present invention, wherein the marine transport 800 further comprises a power gauge 910 arranged to obtain information about an available power C within the marine transport 800.

The request in the receiving the at least one desired property B step also comprises information about the available power C within the marine transport 800 during generation of the transmission beam. The information is obtained by the power gauge 910. The power gauge 910 measures at least one of a speed of a movement of the marine transport, a power output from a power source within the marine transport, and a position of the marine transport, and the available power C is restricted by at least one of these parameters.

Figure 10:
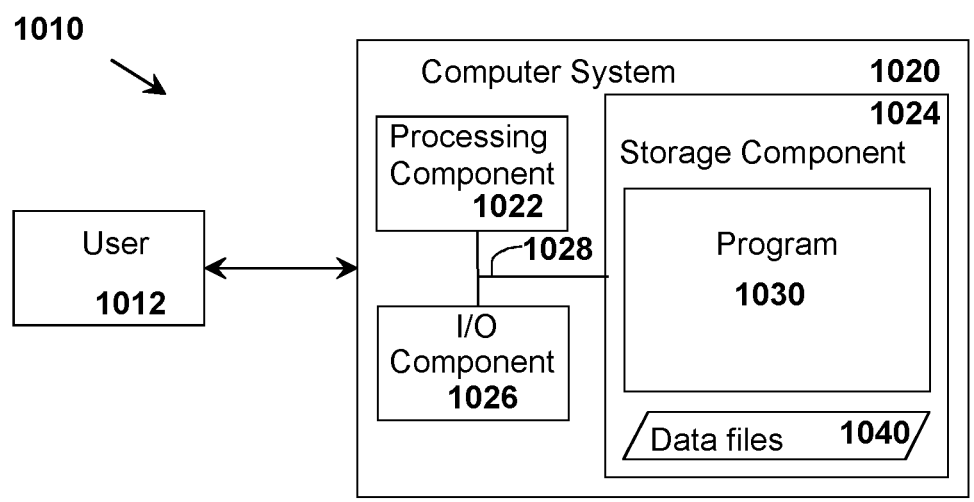
FIG. 10 shows an illustrative environment according to an embodiment of the present invention.

FIG. 10 shows an illustrative environment 1010 according to an embodiment of the present invention, which illustrates a part of the system 600 shown in any one of FIGS. 6-9. The external processor 750 shown in FIG. 7 or 8 is a part of an external system which can also be illustrated by this illustrative environment 1010, with the external processor 750 as a processing component 1022 provided therein.

The skilled person will realise and understand that embodiments of the present invention may be implemented using any suitable computer system, and the example system 600 shown in any one of FIGS. 6-9 is exemplary only and provided for the purposes of completeness only. To this extent, environment 1010 includes a computer system 1020 that can perform a process for putting the method of any one of FIGS. 3-5 described herein into practice in order to perform an embodiment of the invention. In particular, computer system 1020 is shown including a program 1030, which makes computer system 1020 operable to implement an embodiment of the invention by performing a process or a method described herein.

Computer system 1020 is shown including a processing component 1022 (e.g., one or more processors such as the processor 650 of the system 600 shown in any one of FIGS. 6-9), a storage component 1024 (e.g., a storage hierarchy including the storage 710 shown in FIG. 7), an input/output (I/O) component 1026 (e.g., one or more I/O interfaces and/or devices), and a communications pathway 1028. In general, processing component 1022 executes program code, such as program 1030, which is at least partially fixed in storage component 1024. While executing program code, processing component 1022 can process data, which can result in reading and/or writing transformed data from/to storage component 1024 and/or I/O component 1026 for further processing. Pathway 1028 provides a communications link between each of the components in computer system 1020. I/O component 1026 can comprise one or more human I/O devices, which enable a human external user 1012 to interact with computer system 1020 and/or one or more communications devices to enable a system external user 1012, such as the external processor 750 shown in FIG. 7 or 8, to communicate with computer system 1020 using any type of communications link. To this extent, program 1030 can manage a set of interfaces (e.g., graphical user interface(s), application program interface, and/or the like) that enable human and/or system external users 1012 to interact with program 1030. Further, program 1030 can manage (e.g., store, retrieve, create, manipulate, organize, present, etc.) the data, such as a plurality of data files 1040, using any solution.

In any event, computer system 1020 can comprise one or more general purpose computing articles of manufacture (e.g., computing devices) capable of executing program code, such as program 1030, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 1030 can be embodied as any combination of system software and/or application software.

Further, program 1030 can be implemented using a set of modules. In this case, a module can enable computer system 1020 to perform a set of tasks used by program 1030, and can be separately developed and/or implemented apart from other portions of program 1030.

As used herein, the term "component" means any configuration of hardware, with or without software, which implements the functionality described in conjunction therewith using any solution, while the term "module" means program code that enables a computer system 1020 to implement the actions described in conjunction therewith using any solution. When fixed in a storage component 1024 of a computer system 1020 that includes a processing component 1022, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 1020.

When computer system 1020 comprises multiple computing devices, each computing device can have only a portion of program 1030 fixed thereon (e.g., one or more modules). However, it is understood that computer system 1020 and program 1030 are only representative of various possible equivalent computer systems that may perform a process described herein. To this extent, in other embodiments, the functionality provided by computer system 1020 and program 1030 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 1020 includes multiple computing devices, the computing devices can communicate over any type of communications link. Further, while performing a process described herein, computer system 1020 can communicate with one or more other computer systems using any type of communications link. In either case, the communications link can comprise any combination of various types of optical fibre, wired, and/or wireless links; comprise any combination of one or more types of networks; and/or utilize any combination of various types of transmission techniques and protocols.

In any event, computer system 1020 can obtain data from files 1040 using any solution. For example, computer system 1020 can generate and/or be used to generate data files 1040, retrieve data from files 1040, which may be stored in one or more data stores, receive data from files 1040 from another system, and/or the like.

It is understood that any of the steps in the methods described herein may be omitted or ordered differently in an alternative embodiment of the present invention.

Due to limitations in the implemented hardware and in the available processing resources on board the vehicle, such as a marine transport 800 shown in FIGS. 8 and 9, it is often necessary to use a pessimistic set of parameters as the fail-safe limitations when forming a transmission beam. In many cases, this means limiting the transmitted power to a level significantly below that would otherwise have been possible even after considering potentially permanent and/or temporary damage to the components of the vehicle. Such inefficient forming of the transmission beam may occur, in particular, when the transmission beam is steered with an array of a plurality of transducers since the acoustic interactions among the transducers cause wide variations in maximum amplitudes and power levels across the array of the transducers, and only the most pessimistic fail-safe limitations can be employed to the whole array of the transducers to prevent permanent or temporary damage.

The embodiments of the present invention described herein enable use of less pessimistic set of parameters by making use of the array model 200, which is able to model the effects of the acoustic interactions among the transducers.

Further, as the generation of the array model 200 requires computationally intensive processes, which can often require a significant time to perform to completion, the embodiments of the present invention enable generation of the array model 200 (i.e. the first process for forming, or generating, the array model) to be performed separate from the rest of the method or processes for forming a transmission beam. This allows the transducer array comprising a plurality of transducers to be used more efficiently and robustly, with minimum delay in generating the transmission beam once a request for a particular type of an intended transmission beam is received.

Although the first process for forming, or generating, the array model is described herein to output a plurality of lookup tables LUT as a representation of the array model, it is understood that according to an alternative embodiment the first process may output the representation of the array model in any other type of data format capable of representing the array model, i.e. capable of representing the relationships among different parameters defined in the array model, and also capable of enabling the method of forming a transmission beam to access the data stored in the data format.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of forming a transmission beam with a transducer array comprising a plurality of transducers, the method comprising:
   receiving at least one desired property for an intended transmission beam;
   determining an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array, wherein the at least one transducer protection property is used by the array model such that the transducer is protected from damage caused by an excessive operation parameter applied to the transducer; and
   generating the transmission beam using the optimised operation parameter on the transducer array.

2. The method of claim 1 further comprising generating the array model before receiving the at least one desired property for the intended transmission beam.

3. The method of claim 1, wherein determining the optimised operation parameter comprises:
   using the array model to determine the at least one transducer protection property based on the at least one beam property and the at least one desired property, wherein the at least one desired property is used by the array model such that the generated transmission beam formed with the optimised operation parameter is the same as, or the nearest to, the intended transmission beam without damaging the transducer.

4. The method of claim 1, wherein:
   the optimised operation parameter comprises at least one of a maximum voltage, a maximum current, and a maximum power input to the transducer; and
   the excessive operation parameter comprises at least one of a high voltage, a high current, and a high power that causes permanent damage to the transducer.

5. The method of claim 1, wherein:
   the transducer array is a part of a sonar;
   the transmission beam is an acoustic wave for the sonar;
   receiving the at least one desired property comprises receiving a request to transmit the acoustic wave of a predetermined modulation type; and
   the request comprises a frequency and a timing parameter for the predetermined modulation type, a particular steer direction of the transducer array, and an acoustic source level.

6. The method of claim 5, wherein:
   the transducer array is positioned inside a marine transport; and
   the request further comprises information about an available power within the marine transport during generating the transmission beam, the available power restricted by at least one of a speed of a movement of the marine transport, a power output from a power source within the marine transport, and a position of the marine transport.

7. The method of claim 6, wherein:
   the array model comprises a 3D lookup table for different combinations of the at least one beam property and the at least one transducer protection property;
   the at least one beam property comprises a transmission beam type, a directivity index DI, an efficiency $\xi$ of the transducer array, a conductance G, a frequency of the transmission beam, and a steer direction of the transmission beam; and
   the at least one transducer protection property comprises a maximum voltage $V_{MAX}$.

8. The method of claim 7, wherein determining the optimised operation parameter comprises:
   calculating a root mean square sound pressure level (SPL) from the acoustic source level from the request;
   determining a maximum power level $W_{MAX\_TDCR}$ for the transducer by setting the maximum power level $W_{MAX\_TDCR}$ as the minimum value between a maximum available power calculated using the information about the available power within the marine transport from the request, and an absolute maximum power calculated using a duration of the acoustic wave from the request and a predetermined maximum duty cycle for a beam transmission whilst avoiding overheating of the transducer when at a predetermined high power calculated from the information from the request;
   determining an instantaneous frequency for the transducer for forming the acoustic wave calculated using the predetermined modulation type and timing parameter from the request;
   determining a required peak voltage $V_{MAX\_NOM}$ for the determined instantaneous frequency as a function of the conductance G, a beam shading factor, and the efficiency $\xi$ of the transducer array obtained from the 3D lookup table; and setting the optimised operation parameter for the transducer as the required peak voltage $V_{MAX\_NOM}$ if the required peak voltage $V_{MAX\_NOM}$ is smaller than the maximum voltage $V_{MAX}$ at the determined instantaneous frequency, and as the maximum voltage $V_{MAX}$ if the required peak voltage $V_{MAX\_NOM}$ is not smaller than the maximum voltage $V_{MAX}$ at the determined instantaneous frequency.

9. The method of claim 6, wherein the marine transport is a torpedo or a submarine.

10. A system for forming a transmission beam, the system comprising:
a transducer array comprising a plurality of transducers arranged to form the transmission beam;
a receiver arranged to receive at least one desired property for an intended transmission beam; and
a processor arranged to determine an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array, wherein the at least one transducer protection property is used by the array model such that the transducer is protected from damage caused by an excessive operation parameter applied to the transducer, and the processor further arranged to generate the transmission beam using the optimised operation parameter on the transducer array.

11. The system of claim 10 further comprising:
a storage for storing the array model; and
an external processor communicable with the system, wherein the external processor is arranged to generate the array model and communicate the generated array model to the storage;
wherein the processor arranged to determine the optimised operation parameter is further arranged to access the generated array model in the storage when determining the optimised operation parameter.

12. The system of claim 10 further comprising a storage for storing the array model, wherein the processor is arranged to:
generate the array model before the receiving the at least one desired property for the intended transmission beam at the receiver of the system;
store the generated array model in the storage; and
access the generated array model in the storage when determining the optimised operation parameter.

13. The system of claim 10, wherein:
the transducer array is a part of a sonar;
the transmission beam is an acoustic wave for the sonar;
receiving the at least one desired property comprises receiving a request to transmit the acoustic wave of a predetermined modulation type; and
the request comprises a frequency and a timing parameter for the predetermined modulation type, a particular steer direction of the transducer array, and an acoustic source level.

14. The system of claim 13, wherein:
the transducer array is positioned inside a marine transport; and
the request further comprises information about an available power within the marine transport during the step of generating the transmission beam, the available power restricted by at least one of a speed of a movement of the marine transport, a power output from a power source within the marine transport, and a position of the marine transport.

15. The system of claim 14, wherein the marine transport is a torpedo or a submarine.

16. A computer program product including one or more non-transitory machine-readable mediums encoded with instructions that when executed by one or more processors cause a process to be carried out for forming a transmission beam with a transducer array comprising a plurality of transducers, the process comprising:
receiving at least one desired property for an intended transmission beam;
determining an optimised operation parameter for a transducer of the transducer array based on the received at least one desired property and an array model for modelling a relationship between at least one beam property and at least one transducer protection property whilst taking into account of an acoustic mutual coupling of the plurality of transducers of the transducer array, wherein the at least one transducer protection property is used by the array model such that the transducer is protected from damage caused by an excessive operation parameter applied to the transducer; and
generating the transmission beam using the optimised operation parameter on the transducer array.

17. The computer program product of claim 16, wherein determining the optimised operation parameter comprises:
using the array model to determine the at least one transducer protection property based on the at least one beam property and the at least one desired property, wherein the at least one desired property is used by the array model such that the generated transmission beam formed with the optimised operation parameter is the same as, or the nearest to, the intended transmission beam without damaging the transducer.

18. The computer program product of claim 16, wherein:
the optimised operation parameter comprises at least one of a maximum voltage, a maximum current, and a maximum power input to the transducer; and
the excessive operation parameter comprises at least one of a high voltage, a high current, and a high power that causes permanent damage to the transducer.

19. The computer program product of claim 16, wherein:
the transducer array is a part of a sonar;
the transmission beam is an acoustic wave for the sonar;
receiving the at least one desired property comprises receiving a request to transmit the acoustic wave of a predetermined modulation type; and
the request comprises a frequency and a timing parameter for the predetermined modulation type, a particular steer direction of the transducer array, and an acoustic source level.

20. The computer program product of claim 19, wherein:
the transducer array is positioned inside a marine transport; and
the request further comprises information about an available power within the marine transport during generating the transmission beam, the available power restricted by at least one of a speed of a movement of the marine transport, a power output from a power source within the marine transport, and a position of the marine transport.

* * * * *